UNITED STATES PATENT OFFICE.

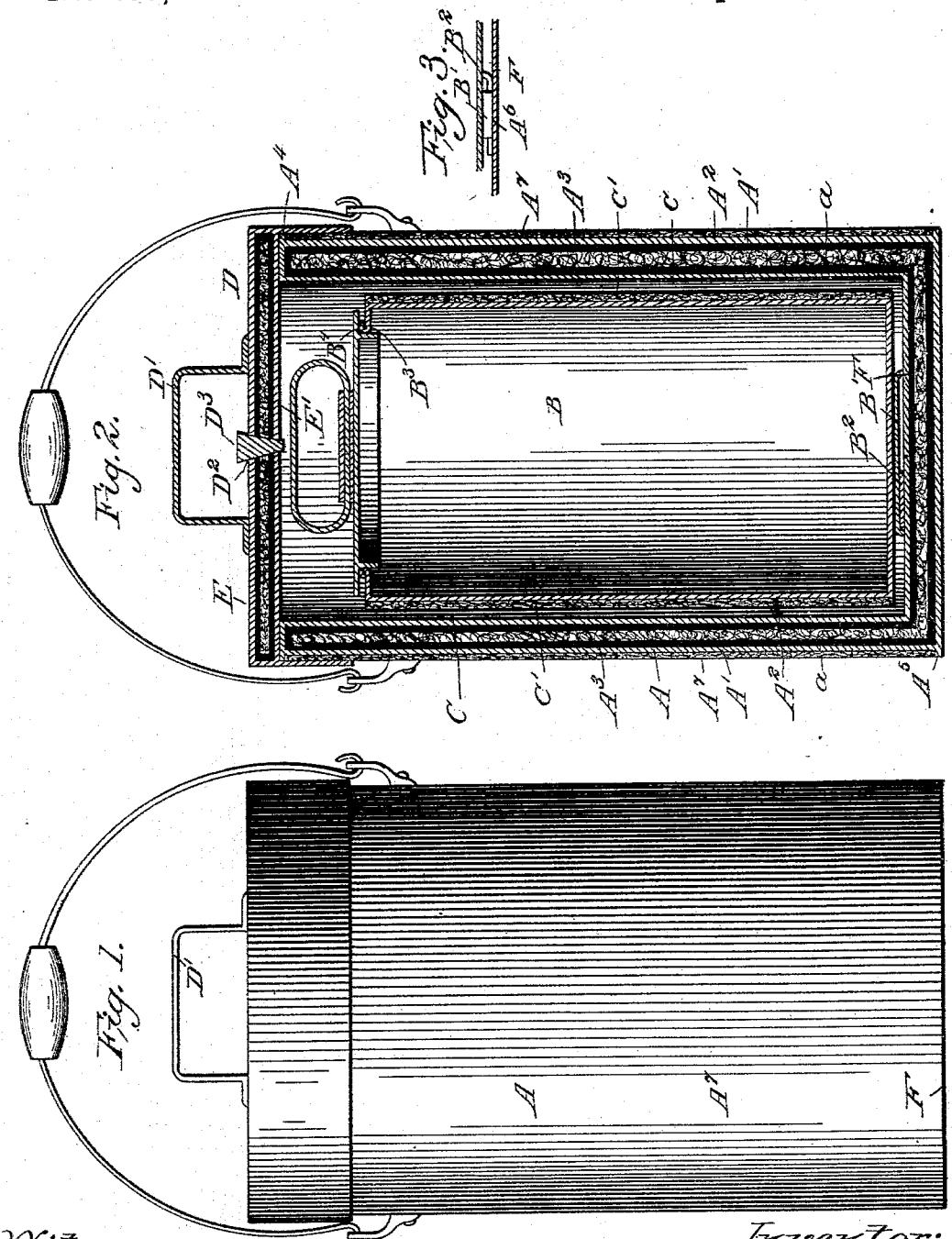

WILLIAM H. SEIDENSTRICKER, OF BALTIMORE, MARYLAND.

ICE-CREAM REFRIGERATOR.

SPECIFICATION forming part of Letters Patent No. 495,065, dated April 11, 1893.

Application filed March 19, 1892. Serial No. 425,649. (No model.)

*To all whom it may concern:*

Be it known that I, WILLIAM H. SEIDENSTRICKER, a citizen of the United States of America, residing at Baltimore, Maryland, have invented certain new and useful Improvements in Ice-Cream Refrigerators, of which the following is a specification, reference being had therein to the accompanying drawings.

My invention pertains to improvements in ice cream refrigerators, for preserving ice-cream for an unprecedented period in its frozen condition without the use of the usual refrigerant, composed of salt and ice; but its novel construction and arrangement of parts is equally applicable to milk cans, water coolers, ice boxes, and refrigerators generally, and it may also be employed with results alike beneficial for preserving in a heated state water, coffee, table viands, &c., and it consists in the novel construction, combination and arrangement of the parts, substantially as hereinafter more fully shown and described.

In the accompanying drawings: Figure 1 is a side elevation of my ice cream refrigerators. Fig. 2 is a sectional elevation thereof; and Fig. 3 is a detail view.

The object of my invention is to produce an ice cream refrigerator, having maximum non-conducting properties especially designed for preserving ice cream in its icy or frozen state as against the melting effect of heat, and in the accomplishment of this purpose I construct an outer and inner cylindrical can preferably, as more convenient, of sheet metal, but do not limit myself to sheet metal as for this purpose wood may be employed. The outer can, A, consists of the coincident walls, $A'$ and $A^2$, which are lined interiorly with felting, $A^3$, and between the linings is packed asbestus, $a$, whose superlative non-conducting power, although hitherto well known to, the arts, is found in practice to greatly surpass all materials hitherto used in this connection as non-conductors. I also secure between the outer can, A, and the inner or cream can, B, that is, in the dead air space, C, a sheet of asbestus felt, $C'$, that surrounds cream can, B. I also provide wall, $A'$, of a can, A, at its top edge and outer periphery with the flange, $A^4$, a similar flange, $A^5$, being provided at its lower edge, and between these flanges made of suitable width I secure by any ordinary means the asbestus band, $A^7$. The bottom, F, of the outer can also consists of a double wall suitably lined on the inside with felting, and having packed and soldered or sealed therein asbestus—the bottom being sealed air-tight and rigidly secured to walls, $A'$ and $A^2$, by ordinary mechanical expedient.

The outer can, A, is constructed slightly larger that the inner or cream can, B, to form the dead air space, C, containing the sheet of asbestus, $C'$, and it has rigidly secured thereto at the bottom the metallic bow or loop, $B'$, which is adapted for reception of the coincident arm or hook, $B^2$, which is in like manner secured to the bottom of the cream can, B, hence in order to secure the inner can against jolting it is only necessary on inserting the same, in the outer can, A, to slightly rotate it in order to cause the hook, $B^2$, to project through the bow or loop, $B'$, which thus holds the can, B, steadfastly supported on said bow or loop, $B'$, and thus is formed in part the dead air space, C, which encompasses the cream-can, B, at all points, and serves as an additional obstacle to the passage of heat interposed between the cans.

The cream can, B, has provided at top an inner projecting flange, $B^3$, whose inner rim is turned over to form the ring, $B^4$, which flange is designed to enable the ready handling or removal of the can.

The cover, D, having the non-conducting walls, E and $E'$, which are lined interiorly with felting, has packed between said wall asbestus, and when the outer can, A, at top is covered therewith, the asbestus packed wall of the cover rests upon the non-conducting wall of the outer can, A, and as the flange of the cover closely fits upon the periphery of the outer can, ingress of atmosphere is prevented. The cover, D, is provided, as usual, with the handle, $D'$, and for additionally facilitating the ready removal from can, A, with the small vertical orifice, $D^2$, to which is adapted the corresponding stopper, $D^3$, preferably made of rubber, and hence when the refrigerator cover is to be withdrawn the stopper which prevents ingress of air through orifice, $D^2$, is removed to admit its ingress, as a means of preventing the atmospheric suction which would otherwise ensue in removing the cover, and to such an extent as to render its removal difficult.

I do not limit myself as to the form of the asbestus employed as it may be employed in either the paste, or sheet form, or in both forms when preferable.

Having thus fully described my invention, what I claim, and desire to secure by Letters Patent, is—

The herein described ice-cream refrigerator consisting of the outer can formed with double walled sides, bottom and cover within which walls are placed linings of felt separated by a layer of asbestus; said can having upper and lower outwardly projecting flanges between which an asbestus band is secured and the cover having a flange which encompasses the upper end of said can; and the inner inclosed can having a cover and also provided with an asbestus covering on its outer surface and removably secured at its base to the bottom of said outer can, substantially as shown and described.

In testimony whereof I affix my signature in presence of two witnesses.

W. H. SEIDENSTRICKER.

Witnesses:
FRED. I. HARRIS,
CHAS. F. WILLIS.